United States Patent [19]

Andre

[11] Patent Number: 4,505,006
[45] Date of Patent: Mar. 19, 1985

[54] CABLE CLAMP

[75] Inventor: Guy Andre, Seyssinet-Pariset, France

[73] Assignee: A. Raymond, Lorrach, Fed. Rep. of Germany

[21] Appl. No.: 569,745

[22] Filed: Jan. 10, 1984

[30] Foreign Application Priority Data

Jan. 12, 1983 [DE] Fed. Rep. of Germany ....... 3300779

[51] Int. Cl.³ ............................ F16L 3/08; F16B 2/20
[52] U.S. Cl. ................................ 24/16 PB; 24/17 AP; 248/56; 248/74.3; 138/106
[58] Field of Search ................ 24/16 PB, 17 AP, 19, 24/274 R, 297; 248/74.3, 74.5, 73, 56, 27.1, 27.3; 292/321, 322; 411/508; 138/106, 107

[56] References Cited

U.S. PATENT DOCUMENTS

| | | | |
|---|---|---|---|
| 2,140,443 | 12/1938 | Clark | 248/56 |
| 2,141,878 | 12/1938 | Roby | 248/56 |
| 3,154,281 | 10/1964 | Frank | 248/74.3 |
| 3,193,613 | 7/1965 | Van Buren, Jr. | 248/56 |
| 3,285,551 | 11/1966 | Tschanz | 248/56 |
| 3,768,115 | 10/1973 | Hoffmann et al. | 248/56 |
| 3,809,350 | 5/1974 | Lane | 138/106 |
| 4,222,539 | 9/1980 | Kramer | 248/74.5 |

FOREIGN PATENT DOCUMENTS

| | | | |
|---|---|---|---|
| 1272234 | 8/1961 | France | 248/56 |
| 2014644 | 8/1979 | United Kingdom . | |

*Primary Examiner*—Victor N. Sakran
*Attorney, Agent, or Firm*—Finnegan, Henderson, Farabow, Garrett & Dunner

[57] ABSTRACT

A clamp of a resilient material for holding circular objects of different diameters to a fixed surface, the clamp has a circular member having side rims, a central passageway, two ends that when spread apart provide access for the object to the passageway and a leg at each end that cooperate, when the ends of the member are compressed together, to hold the clamp to a fixed surface. A plurality of holding fingers extend outwardly from both side rims of the circular member along the length of the object and inwardly so that they converge conically toward each other and the object being held.

4 Claims, 7 Drawing Figures

CABLE CLAMP

BACKGROUND OF THE INVENTION

This invention relates to a clamp made of a relatively hard, but resilient plastic material for holding elongated objects of circular cross-section and of varying diameter to a supporting structure, such as cables, cable harnesses, hoses and the like. More particularly, the clamp includes a circular member that extends around the outside of the cable or the like and a plurality of resilient holding fingers that extend outwardly from both sides of the member along the length of the cable and inwardly toward the center of the clamp to center and hold the cable within in the clamp.

Prior art clamps of this type are shown, for example, in German Offenlegungsschrift No. 2807119 (Aug. 23, 1979) or British Pat. No. 2014644B, particularly in FIGS. 12–15 of each patent. In these clamps the holding fingers extend radially inward from the inside of the circular wall of the clamp and then slant alternately to either side to hold the cable within the clamp. A disadvantage of this design is that the holding fingers can only be opened up a limited distance and, as a consequence, the full inside area of the circular clamping member cannot be used, thus limiting the range of cable diameters that can be used with the clamp.

SUMMARY OF THE INVENTION

It is an object of the present invention to provide a holding fingers-type clamp in which practically the entire space inside the clamp is available to receive the cable.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claim.

To achieve the foregoing objects and in accordance with the purpose of the invention, as embodied and broadly described herein, the clamp of the present invention for holding elongated circular objects of varying diameters to a fixed surface comprises a circular member that extends transversely around the object, said member having side rims, a central passageway and two ends that when spread apart provide access for the object to the passageway. A leg is provided at each end of the member that cooperate with each other when the ends are compressed together to hold the clamp to a fixed surface and a plurality of resilient holding fingers extend outwardly from the side rims of the circular member along the length of the object and inwardly so that they converge conically toward each other and the object being held by the clamp.

DETAILED DESCRIPTION OF THE INVENTION

Further features of the invention and its advantages can be found in the description which follows and in the following drawings.

Figure 1:
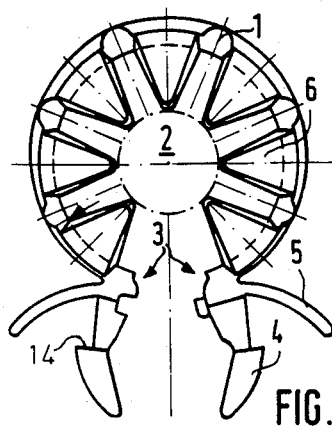
FIG. 1 is a front view of the cable clamp of the present invention having holding fingers.
Figure 3:
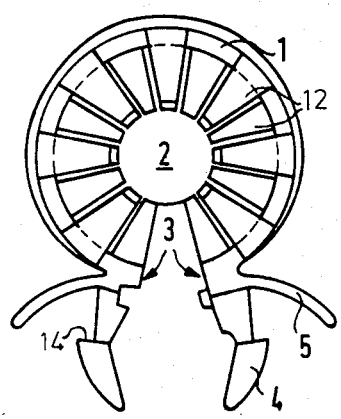
FIG. 3 is a front view of an alternative embodiment of a cable clamp with holding fingers.
Figure 5:
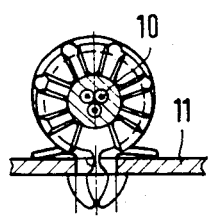
FIG. 5 is a front view of the cable clamp holding a cable and secured to a fixed surface.

The cable clamp shown in the drawing consists essentially of a circular clamping member 1 surrounding a central passageway 2, the ends 3 of which can be brought together to close the passageway 2. Each end 3 is provided with a leg 4 having means which cooperate with each other when the legs are compressed together, following insertion of a circular object, such as cable 10 into passageway 2, to secure the clamp in a hole in a support plate. As embodied and as shown in FIGS. 1, 3 and 5, this means comprises a projection 14 on each leg 4 that engages the underside of the hole in plate 11. Clamping member 1 as well as legs 4, are of suitable resilient material so that projections 14 will positively lock the clamp to the plate. Shoulders 5 are also provided at each end 3 that extend laterally in a direction perpendicular to the cable and downwardly so that they press against the surface of plate 11 to stabilize the clamp on the plate.

Figure 2:
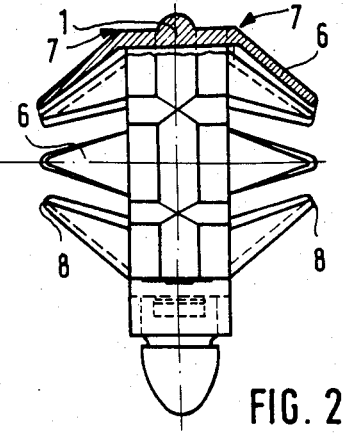
FIG. 2 is a side view of the clamp of FIG. 1 with a partial section in the upper portion.

In accordance with the invention and as shown in FIG. 2, a plurality of resilient holding fingers 6, are uniformly distributed around and extend outwardly from the periphery of both side rims 7 of member 1 along the length of the cable being held. The fingers are integrally connected to clamping member 1 at their base and point inwardly toward the center of passageway 2.

Figure 6:
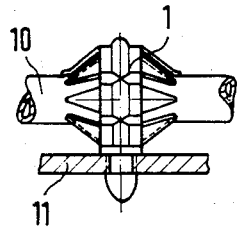
FIG. 6 is a side view of the assembly of FIG. 5.
Figure 7:
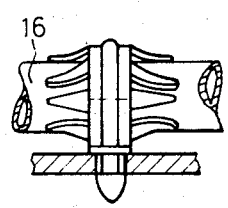
FIG. 7 is a view similar to FIG. 6, but showing the clamp used with a thicker cable.

Preferably, and as best shown in FIG. 2, holding fingers 6 are acute-angle segments of a conical surface so that they converge conically toward each other. This brings the ends 8 of fingers 6 close enough together so that they can firmly grip the smallest cables 10 to be secured, as shown in FIG. 6, while being able to be spread apart a sufficient distance to hold cables 16 almost as large as the inside diameter of the clamp as shown in FIG. 7.

Figure 4:
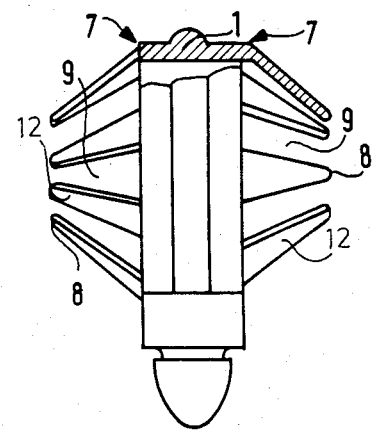
FIG. 4 is a side view of the clamp of FIG. 3 with a partial section in the upper portion.

As regards FIGS. 1 and 2, these segment-shaped holding fingers 6 are arranged so that they are directly opposite one another in an axial direction. The manufacture of such a clamp can be somewhat complex, however, and to avoid this, as shown in the alternative embodiment of FIGS. 3 and 4, the segmented holding fingers 12 can be interrupted by spaces 9 of equal width. In this embodiment and as best shown in FIG. 4, the holding fingers 12 on one side of the clamp and also directly opposite spaces 9 on the other side. Such an arrangement of the fingers and spaces permits the clamp to be produced in the form of two mutually engagable molded halves.

While the holding fingers 12 are narrower than the fingers 6 of FIGS. 1 and 2 because they are separated by spaces 9 of equal width, they can be made somewhat thicker than holding fingers 6 to compensate for any resulting loss in their ability to hold the cable in place.

By constructing the clamp in this manner, a wider range of cable diameters can be used than in prior art holding fingers-type clamps. Moreover the ends of the holding fingers grab the cable at a greater axial distance than the fingers in the known cable clamp leading to a better and firmer grip on the cable.

It will be apparent to those skilled in the art that various modifications can be made without departing from the scope or spirit of the invention and without sacrificing its chief advantages.

What is claimed is:

1. A clamp made of a resilient material for holding circular objects of different diameters to a fixed surface comprising a circular member that extends transversely around the object, the member having side rims, a central passageway, two ends that when spread apart provide access for the object to the passageway, and a leg at each end that cooperate with each other, when the ends of the member are compressed together, to hold the clamp to a fixed surface and a plurality of resilient holding fingers that extend outwardly from both side rims of the circular member along the length of the object and slant inwardly toward the center of the clamp so that they converge conically toward each other and grip the object being held whereby circular objects of different diameters up to near the full inside diameter of the central passageway can be held by the clamp.

2. The clamp of claim 1, wherein the fingers are uniformly distributed around the periphery of and are integral with the side rims of the circular member.

3. The clamp of claim 2, wherein the fingers form acute-angle segments of a conical surface with the base of the segments being integral with the rims and the tips pointing inwardly toward the center of the clamp.

4. The clamp of claim 3, wherein the segment-shaped holding fingers alternate with spaces of substantially equal width where they join the rims, with the segments on one side of the circular member being opposite a space on the other.

* * * * *